United States Patent
Lee et al.

(10) Patent No.: US 10,268,241 B2
(45) Date of Patent: Apr. 23, 2019

(54) TOUCH SCREEN PANEL AND MOBILE TERMINAL INCLUDING THE SAME

(71) Applicant: SAMSUNG DISPLAY CO., LTD., Yongin-si, Gyeonggi-Do (KR)

(72) Inventors: Kang Won Lee, Seoul (KR); Hee Woong Park, Hwaseong-si (KR); Young Seok Yoo, Suwon-si (KR); Jeong Heon Lee, Seongnam-si (KR); Choon Hyop Lee, Suwon-si (KR); In Nam Lee, Yongin-si (KR); Hyun Jae Lee, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 38 days.

(21) Appl. No.: 15/434,534

(22) Filed: Feb. 16, 2017

(65) Prior Publication Data
US 2017/0242457 A1    Aug. 24, 2017

(30) Foreign Application Priority Data
Feb. 19, 2016 (KR) .................. 10-2016-0019842

(51) Int. Cl.
*G06F 3/041* (2006.01)
*G06F 1/16* (2006.01)

(52) U.S. Cl.
CPC .......... *G06F 1/1643* (2013.01); *G06F 1/1658* (2013.01); *G06F 1/1686* (2013.01); *G06F 3/0412* (2013.01); *G06F 3/0416* (2013.01); *G06F 2203/04102* (2013.01)

(58) Field of Classification Search
CPC .... G06F 1/1643; G06F 1/1658; G06F 3/0416; G06F 1/1686; G06F 3/0412; G06F 2203/04102
See application file for complete search history.

(56) References Cited

U.S. PATENT DOCUMENTS

| | | | |
|---|---|---|---|
| 4,716,259 A | 12/1987 | Tokura et al. | |
| 2006/0038019 A1* | 2/2006 | Kajiwara | H04M 1/0216 235/472.02 |
| 2009/0289885 A1* | 11/2009 | Chao | H05K 1/147 345/98 |
| 2010/0148207 A1* | 6/2010 | Ryutani | H01L 23/13 257/99 |
| 2013/0140072 A1 | 6/2013 | Wu et al. | |

FOREIGN PATENT DOCUMENTS

| KR | 10-2006-0049341 | 5/2006 |
|---|---|---|
| KR | 10-1181926 | 9/2012 |
| KR | 10-2016-0110861 | 9/2016 |

* cited by examiner

*Primary Examiner* — Adam R. Giesy
(74) *Attorney, Agent, or Firm* — F. Chau & Associates, LLC

(57) ABSTRACT

A touch screen panel including a display panel; a first flexible circuit board including a first end connected to the display panel, the first flexible circuit board having at least one first opening; a touch panel disposed on the display panel and the first flexible circuit board; and a second flexible circuit board including a first end connected to the touch panel, the second flexible circuit board having at least one second opening corresponding to the at least one first opening.

21 Claims, 7 Drawing Sheets

TOUCH SCREEN PANEL AND MOBILE TERMINAL INCLUDING THE SAME

CROSS-REFERENCE TO RELATED APPLICATION

This application claims priority under 35 U.S.C. § 119 to Korean Patent Application No. 10-2016-0019842 filed in the Korean Intellectual Property Office on Feb. 19, 2016, the entire contents of which are incorporated by reference herein.

TECHNICAL FIELD

Exemplary embodiments of the present invention relate to a display panel, and more particularly to a touch screen display panel and a mobile terminal including the same.

DISCUSSION OF RELATED ART

As functions of a mobile terminal have diversified, various input devices or output devices such as a touch screen, a camera, and a sensor are provided in the mobile terminal.

For example, a touch screen may be provided in a mobile terminal. The touch screen performs is both an input device and an output device of the mobile terminal. The touch screen is configured as a display panel. The display panel is an output device. The touch screen is also configured as a touch panel. The touch panel is an input device. The display panel and the touch panel are respectively connected to a circuit board through films, for example, a chip on film (COF) or a flexible flat cable (FFC).

One terminal of the film is connected to a pad part of the touch screen. The other terminal of the film is connected to the pad part of the circuit board. To reduce a size of the touch screen corresponding to a bezel region, since the circuit board is positioned at a rear surface of the touch screen, the film is disposed with a curved shape inside the mobile terminal. As the film connected to the circuit board is disposed with the curved shape, a space to dispose parts such as a camera and a sensor is limited inside the mobile terminal.

SUMMARY

An exemplary embodiment of the present invention provides a touch screen panel providing the space to dispose the various parts of the mobile terminal, and a mobile terminal including the same.

An exemplary embodiment of the present invention provides a touch screen panel with a reduced size of the bezel region, and a mobile terminal including the same.

One or more exemplary embodiments of the present invention provide a touch screen panel. The touch screen panel includes a display panel, a first flexible circuit board, a touch panel, and a second flexible circuit board. The first flexible circuit board includes a first end connected to the display panel. The first flexible circuit board includes at least one first opening. The touch panel is disposed on the display panel and the first flexible circuit board. The second flexible circuit board includes a first end connected to the touch panel. The second flexible circuit board has at least one second opening corresponding to the at least one first opening.

The first flexible circuit board may include a first bending area that is bent so that a second end of the first flexible circuit board is positioned at a rear surface of the display panel. The second end may be opposite the first end.

The second flexible circuit board may include a second bending area that is bent so that a second end of the second flexible circuit board is positioned at the rear surface of the display panel. The second end may be opposite the first end.

The first flexible circuit board may be bent within the first bending area. The second flexible circuit board may be bent within the second bending area. The at least one first opening and the at least one second opening may be overlapped with each other.

The at least one first opening may be disposed in the first bending area.

The first flexible circuit board may include the first base film, a plurality of first signal wires, and an IC chip. The first signal wires may be disposed on the first base film. The IC chip may be disposed on the first base film and connected to the first signal wires. The first opening may be disposed in the first bending area of the first base film.

The touch screen panel may include a driving circuit substrate. The driving circuit substrate may be connected to the second end of the first flexible circuit board and driving the display panel.

The at least one second opening may be disposed in the second bending area.

The second flexible circuit board may include a second base film, and a plurality of second signal wires. The second signal wires may be disposed on the second base film. The second opening may be disposed in the second bending area of the second base film.

The touch panel may include an edge. The edge may have a concave shape in a plan view corresponding to a plane shape of the at least one second opening.

One or more exemplary embodiments of the present invention provide a mobile terminal. The mobile terminal includes a touch screen, a camera, a first flexible circuit board, and a second flexible circuit board. The touch screen includes a display panel and a touch panel. The touch panel is disposed on the display panel. The first flexible circuit board includes a first end connected to the display panel. The first flexible circuit board has at least one first opening. The second flexible circuit board includes a first end connected to the touch panel. The second flexible circuit board has at least one second opening corresponding to the at least one first opening. At least a portion of the camera is positioned in each of the at least one first opening and the at least one second opening.

The first flexible circuit board may include a first bending area that is bent so that a second end of the first flexible circuit board is positioned at the rear surface of the display panel.

The second flexible circuit board may include a second bending area that is bent so that a second end of the second flexible circuit board is positioned at a rear surface of the display panel.

The first flexible circuit board may be bent within the first bending area. The second flexible circuit board may be bent within the second bending area. The at least one first opening may form at least one first groove. The at least one second opening may form at least one second groove. The at least one first groove and the at least one second groove may be overlapped with each other.

At least a portion of the camera may be disposed in each of the at least one first groove and the at least one second groove.

The at least one first opening may be disposed in the first bending area.

The first flexible circuit board may include a first base film, a plurality of first signal wires, and an IC chip. The first signal wire may be disposed on the first base film. The IC chip may be disposed on the first base film. The IC chip may be connected to the first signal wires. The at least one first opening may be disposed on the first bending area of the first base film.

The at least one second opening may be disposed in the second bending area.

The second flexible circuit board may include a second base film and a plurality of second signal wires. The second signal wires may be disposed on the second base film. The at least one second opening is disposed in the second bending area of the second base film.

The touch panel may include an edge. The edge may have a concave shape in a plan view corresponding to a plane shape of the at least one second opening.

One or more exemplary embodiments of the present invention provide a touch screen panel. The touch screen panel includes a display panel, a first flexible circuit board, a touch panel, and a second flexible circuit board. The first flexible circuit board may have at least one first opening having a plane shape. The touch panel may be disposed on the display panel and the first flexible circuit board. The second flexible circuit board may have at least one second opening having a plane shape. The at least one second opening may correspond to the at least one first opening. The plane shape of the at least one first opening may correspond to the plane shape of the at least one second opening.

The first flexible circuit board may include a first end. The first end may be connected to the display panel. The second flexible circuit board may include a first end. The first end may be connected to the touch panel.

The first flexible circuit board may include a first bending area. The first bending area may be bent so that a second end of the first flexible circuit board is positioned at a rear of the surface of the display panel. The second end may be opposite the first end.

The second flexible circuit board may include a second bending area. The second bending area may be bent to that a second end of the second flexible circuit board is positioned at the rear surface of the display panel. The second end may be opposite the first end.

BRIEF DESCRIPTION OF THE DRAWINGS

A more complete appreciation of the present disclosure and many of the attendant aspects thereof will be readily obtained as the same becomes better understood by reference to the following detailed descriptions when considered in connection with the accompanying drawings, in which.

DETAILED DESCRIPTION OF THE EMBODIMENTS

Figure 1:
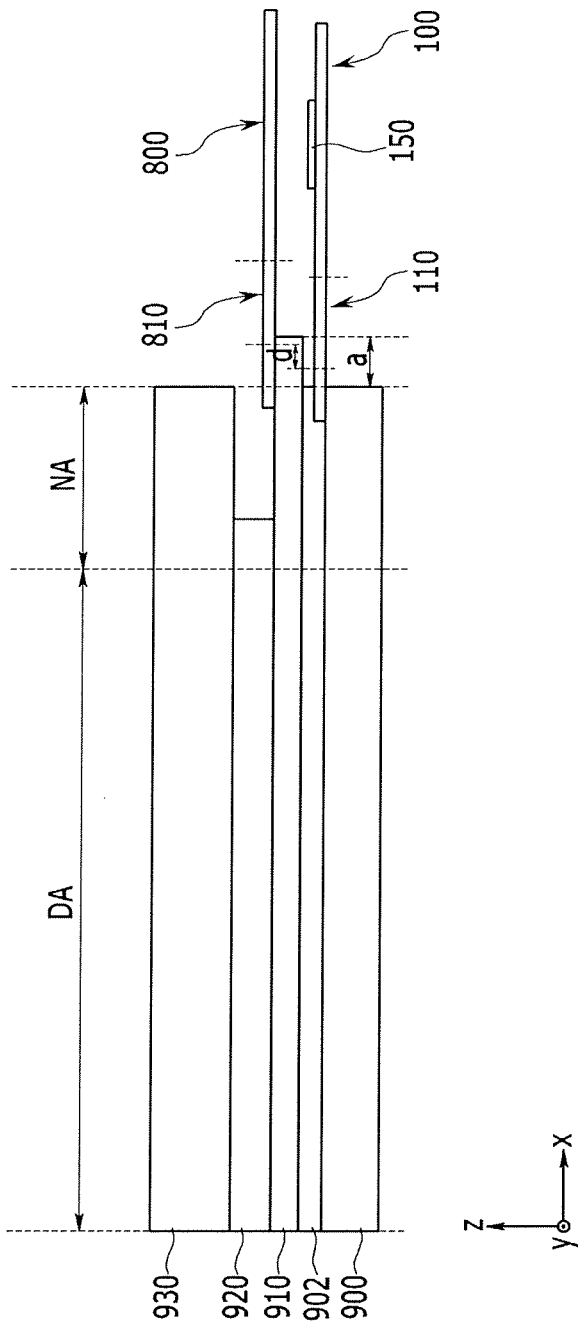
FIG. 1 is a cross-sectional view illustrating a touch screen of a mobile terminal according to an exemplary embodiment of the present invention.

One or more exemplary embodiments of present invention will be described more fully hereinafter with reference to the accompanying drawings. As those skilled in the art would realize, the described exemplary embodiments of the present invention may be modified in various different ways, all without departing from the spirit or scope of the present invention.

Like reference numerals may designate like elements throughout.

Since sizes and thicknesses of constituent members shown in the accompanying drawings are provided for better understanding and ease of description. In the drawings, the thickness of layers, films, panels, regions, etc., may be exaggerated for clarity. In the drawings, for better understanding and ease of description, the thicknesses of some layers and areas may be exaggerated.

It will be understood that when an element such as a layer, film, region, or substrate is referred to as being "on" another element, it can be directly on the other element or intervening elements may also be present. Further, the word "on" or "above" means positioned on or below the object portion, and does not necessarily mean positioned on the upper side of the object portion based on a gravitational direction.

The mobile terminal described below may be a mobile phone, a smart phone, a laptop computer, a digital broadcasting terminal, a personal digital assistant (PDA), a portable multimedia player (PMP), a navigation device, a slate computer, a tablet computer, an ultrabook, a wearable device, for example, a watch-type terminal (e.g., a smartwatch), a glass terminal (e.g., a smart glass), or a head mounted display (HMD).

However, the configuration according to an exemplary embodiment of the present invention can be easily recognized by those skilled in the art such that the invention may be applied to fixed terminals such as digital signage, a digital TV, and a desktop computer, and is not limited to the mobile terminal.

FIG. 1 is a cross-sectional view illustrating a touch screen of a mobile terminal according to an exemplary embodiment of the present invention.

Referring to FIG. 1, the touch screen may include a display panel 900, a first flexible circuit board 100, an adhesive member 902, a touch panel 910, a second flexible circuit board 800, a polarization member 920, and a window 930.

The display panel 900 may include a display area DA and a non-display area NA. The display panel 900 may also include a plurality of pixels. The pixels may display an image. If the display panel 900 is included in an organic light-emitting device, the pixels may each include a plurality of organic light-emitting elements and a plurality of transistors. The transistors may drive the organic light-emitting elements. The display panel 900 may be included in a liquid crystal display.

The first flexible circuit board 100 may be positioned on the display panel 900. For example, a portion of the first flexible circuit board 100 may be disposed on the display panel 900. The display panel 900 may include a pad part. The pad part may be positioned in the non-display area NA. The first flexible circuit board 100 may be connected to the pad part of the display panel 900. The first flexible circuit board 100 may be a flexible printed circuit board (PCB) (FPCB) or a chip on film (COF). The first flexible circuit board 100 may be mounted with an integrated circuit (IC) chip 150. The first flexible circuit board 100 may be mounted with an IC chip 150 such that the first flexible circuit board 100 is the chip on film (COF).

The first flexible circuit board 100 may include at least one first opening 110. When the first flexible circuit board 100 is curved in a rear surface direction of the display panel 900, the first opening 110 may be curved together therewith. The parts in the mobile terminal may be positioned in the curved first opening 110.

The first flexible circuit board 100 may include a plurality of first openings 110. The first openings 110 may be disposed at positions corresponding to a plurality of parts. A position relationship of the first opening 110 and a part will be described in detail below.

The adhesive member 902 may be disposed on the display panel 900 and the first flexible circuit board 100. The adhesive member 902 may include a transparent adhesive material having a relatively high light transmittance. The adhesive member 902 may include a resin or an optically clear adhesive (OCA). The adhesive member 902 may adhere the display panel 900 to the touch panel 910. The adhesive member 902 may adhere the first flexible circuit board 100 to the touch panel 910.

The touch panel 910 may be configured to sense a touch of a user. The touch panel 910 may be adhered to the display panel 900. The touch panel 910 may be adhered to the display panel 900 by the adhesive member 902. The touch panel 910 may be disposed on the display panel 900. The touch panel 910 may include a touch sensing structure. For example, the touch sensing structure may include a plurality of first touch sensing electrodes. The first touch sensing electrodes may be substantially parallel to each other. The touch panel 910 may also include a plurality of second touch sensing electrodes. The second touch sensing electrodes may be disposed in a direction crossing the first touch sensing electrodes. The touch sensing structure may be disposed to correspond to the pixels positioned in the display area DA of the display panel 900.

In the non-display area NA, one end of the touch panel 910 may extend further than one end of the display panel 900 in a first direction (e.g., an X-axis direction). For example, one end of the touch panel 910 may extend by a first predetermined length "a" compared with one end of the display panel 900.

The second flexible circuit board 800 may be disposed on the touch panel 910. The second flexible circuit board 800 may be connected to the pad part of the touch panel 910 disposed in the non-display area NA of the display panel 900. The second flexible circuit board 800 may be the flexible printed circuit board (PCB) (FPCB) or the chip on film (COF). The second flexible circuit board 800 might not include the IC chip. Thus, the second flexible circuit board 800 may be the flexible printed circuit board (PCB) (FPCB).

The second flexible circuit board 800 may include at least one second opening 810. The second opening 810 of the second flexible circuit board 800 may be positioned to correspond to the first opening 110. An edge of the second opening 810 may be separated from a corresponding edge of the first opening 110. The edge of the second opening 810 may be separated from the corresponding edge of the first opening 110 by a second length "d" along the first direction (e.g., the X-axis direction).

When the second flexible circuit board 800 is bent in the rear surface direction of the display panel 900, the second opening 810 may also be bent similar to the first opening 110. A part of the mobile terminal may be positioned at the bent second opening 810.

The second flexible circuit board 800 may have a plurality of second openings 810. The second openings 810 may correspond to the first openings 110. A position relationship of the second opening 810 and the part will be described in detail below.

The polarization member 920 may be disposed on the touch panel 910. The polarization member 920 may absorb light reflected from a surface of the display panel 900 or the touch panel 910. According to an exemplary embodiment of the present invention, since the touch panel 910 is disposed between the display panel 900 and the polarization member 920, the touch sensing structure may block or reduce light and may minimize the reflection of light.

A window 930 may be disposed on the polarization member 920. The window 930 may increase the strength of the display unit 900. The window 930 may include polymethyl methacrylate (PMMA), an acryl, and/or a polyester (e.g., PET).

The display panel 900 and the touch panel 910 according to an exemplary embodiment of the present invention will be described in detail with reference to FIG. 2.

Figure 2:
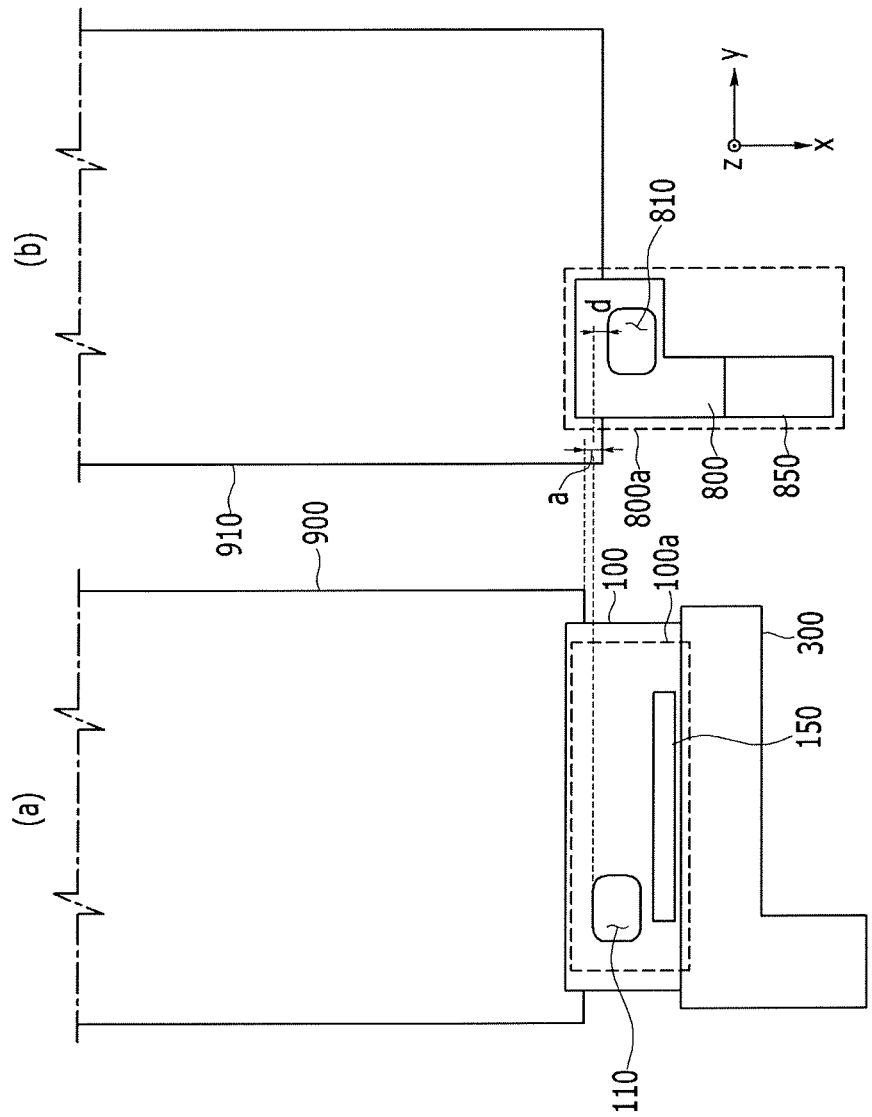
FIG. 2 is a top plan view schematically illustrating a display panel and a touch panel of a touch screen of a mobile terminal according to an exemplary embodiment of the present invention.

FIG. 2 is a top plan view schematically illustrating a display panel and a touch panel of a touch screen of a mobile terminal according to an exemplary embodiment of the present invention. As illustrated in FIG. 2 (a), the display panel 900, the first flexible circuit board 100, and a driving circuit substrate 300 may be sequentially stacked. As illustrated in FIG. 2 (b), the touch panel 910, the second flexible circuit board 800, and a touch control circuit board 850 may be sequentially stacked.

The touch panel 910 may be disposed so that one end of the touch panel 910 extends by the first predetermined length a along the first direction (e.g., the X-axis direction) compared with one end of the display panel 900.

For example, the second flexible circuit board 800 bonded to one end of the touch panel 910 may be bent in the rear surface direction of the display panel 900. When the touch panel 910 is shorter than the display panel 900 in the first direction (e.g., the X-axis direction) or has substantially the same length as the display panel 900, the second flexible circuit board 800 may have a length including the thickness of each of the adhesive member 902 and the display panel 900. However, when the touch panel 910 is longer than the display panel 900 in the first direction (e.g., the X-axis direction) by the first length a, the second flexible circuit board 800 may have a length of which the first length a is subtracted from the combined thickness of the adhesive member 902 and the display panel 900.

Thus, when the touch panel 910 is longer than the display panel 900 in the first direction (e.g., the X-axis direction) by the first length a, the length of the second flexible circuit board 800 may be reduced. Accordingly, damage to the second flexible circuit board 800 by an external impact may be reduced or prevented. Further, manufacturing costs of the second flexible circuit board 800 may be reduced.

Figure 3:
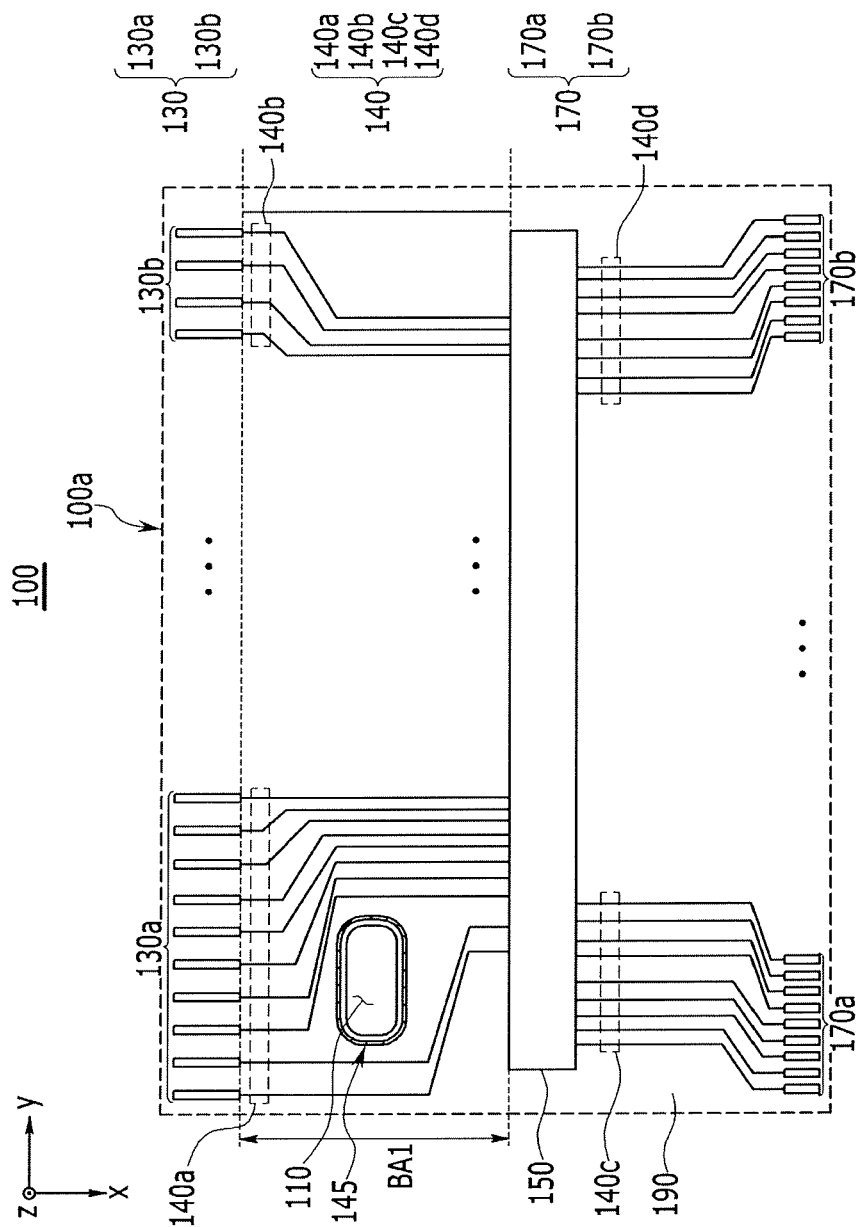
FIG. 3 illustrates a part of a first flexible circuit board bonded to a display panel of FIG. 2 according to an exemplary embodiment of the present invention.

The first flexible circuit board 100 bonded with the display panel 900 may include the first opening 110. The IC chip 150 may be disposed in the first flexible circuit board 100. In FIGS. 1 to 3, the IC chip 150 may be disposed at an upper surface of the first flexible circuit board 100; however, exemplary embodiments of the present invention are not limited thereto. The IC chip 150 may be disposed at a lower surface of the first flexible circuit board 100. Alternatively, the IC chip 150 may be disposed at an inner region of the first flexible circuit board 100.

A position of each of the first opening 110 and the IC chip 150 may be variously changed. For example, the position of each of the first opening 110 and the IC chip 150 may be changed depending on a position of the part of the mobile terminal.

The first opening 110 may have a plane shape; however, exemplary embodiments of the present invention are not limited thereto. For example, the first opening 110 may have a shape of a circle, an oval, a polygon, or a shape having at least one partial circular portion. The first opening 110 may include a shape of which a part is formed of a curved line. The polygon may include quadrangles, pentagons, hexagons, or octagons. The plane shape of the first opening 110 and a plane area of the first opening 110 may be variously changed. For example, the plane shape and plane area of the first opening 110 may be variously changed depending on the shape and the size of the part corresponding to the first opening 110. The plane may be an X-Y plane.

The IC chip 150 may be configured to transmit a driving signal to the display panel 900. Thus, the IC chip 150 may have a driving signal output. The driving signal output from the IC chip 150 may be transmitted to the display panel 900 through a first pad part 130 of FIG. 3. By the driving signal transmitted from the IC chip 150, the signals to display the image may be transmitted to the pixels. For example, the IC chip 150 may be a scan driving circuit or a data driving circuit. The scan driving circuit may be configured to generate a scan signal. The data driving circuit may be configured to generate a data signal.

The first flexible circuit board 100 will be described in more detail with reference to FIG. 3 below. FIG. 3 illustrates a part of a first flexible circuit board bonded to a display panel of FIG. 2 according to an exemplary embodiment of the present invention.

The driving circuit substrate 300 may be bonded to the first flexible circuit board 100. As the first flexible circuit board 100 is bent, the driving circuit substrate 300 may be positioned at a rear surface of the display panel 900.

The driving circuit substrate 300 may include a driving circuit. The driving circuit may be configured to drive the display panel 900. For example, a signal controller may be disposed on the driving circuit substrate 300. The signal controller may be configured to generate a control signal. The control signal may control the image realized in the display panel 900. The control signal may be provided to the IC chip 150, for example, through the first flexible circuit board 100.

The driving circuit substrate 300 may include a plurality of electronic parts. The electronic parts may be configured to control various functions of the mobile terminal. For example, the driving circuit substrate may 300 may include a speaker module or a memory chip with a camera module. The camera modules may be operated in connection with the display panel 900.

According to an exemplary embodiment of the present invention, the driving circuit substrate 300 may be a flexible printed circuit board (FPCB).

The second flexible circuit board 800 bonded with the touch panel 910 may include the second opening 810. A position of the second opening 810 may be variously changed. For example, the position of the second opening 810 may be changed depending on the position of the first opening 110.

The second opening 810 may have a plane shape; however, exemplary embodiments of the present invention are not limited thereto. For example, the second opening 810 may have the shape of a circle, an oval, a polygon, or a shape having the partial circular portion. The second opening 810 may include a shape of which a part is formed as a curved line. The polygon may include quadrangles, pentagons, hexagons, or octagons.

The plane shape of the second opening 810 may correspond to the plane shape of the first opening 110. For example, when the plane shape of the first opening 110 is a circle, the plane shape of the second opening 810 may be a circle.

The plane shape of the second opening 810 and the plane area of the second opening 810 may be variously changed. For example, the plane shape and the plane area of the second opening 810 may be changed depending on the plane shape and the plane area of the first opening 110. For example, the plane area of the second opening 810 may be relatively wider than the plane area of the first opening 110.

An edge of the second opening 810 may be separated from a corresponding edge of the first opening 110. The edge of the second opening 810 may be separated from the corresponding edge of the first opening 110 by the second length d along the first direction (e.g., the X-axis direction).

The first flexible circuit board 100 bonded to one end of the display panel 900 and the second flexible circuit board 800 bonded to one end of the touch panel 910 may be bent together in the rear surface direction of the display panel 900.

For example, when the edge of the second opening 810 is not separated from the corresponding edge of the first opening 110 along the first direction (e.g., the X-axis direction), the position of the first opening 110 of the bent first flexible circuit board 100 and the position of the second opening 810 of the second flexible circuit board 800 might not be aligned with each other. The position of the first opening 110 and the position of the second opening 810 might not be aligned with each other due to a thickness of each of the adhesive member 902 and the touch panel 910 disposed between the first flexible circuit board 100 and the second flexible circuit board 800.

However, due to the thickness of the adhesive member 902 and the touch panel 910, when the edge of the second opening 810 is separated from the corresponding edge of the first opening 110 along the first direction (e.g., the X-axis direction) by the second length d, the position of the first opening 110 of the bent first flexible circuit board 100 and the position of the second opening 810 of the bent second flexible circuit board 800 may align with each other. Thus, the first opening 110 of the bent first flexible circuit board 100 and the second opening 810 of the bent second flexible circuit board 800 may overlap each other.

When the edge of the second opening 810 is separated from the corresponding edge of the first opening 110 along the first direction (e.g., the X-axis direction) by the second length d, the position of the first opening 110 of the bent first flexible circuit board 100 and the position of the second opening 810 of the bent second flexible circuit board 800 may overlap each other. The part may be disposed in each of the first opening 110 and the second opening 810, for example, such that an inner space of the mobile terminal may be utilized.

Figure 4:
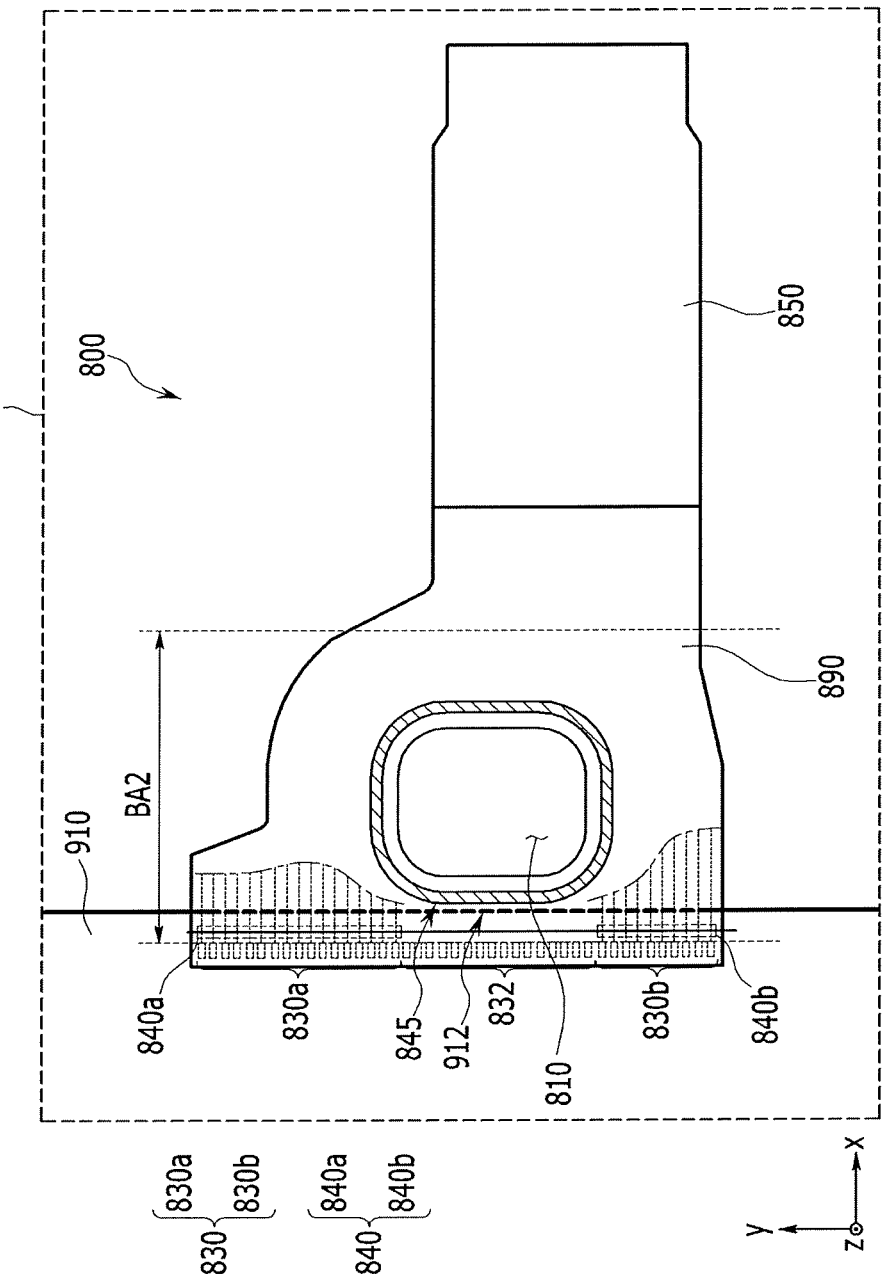
FIG. 4 illustrates a touch panel of FIG. 2 and a part of a second flexible circuit board connected to the touch panel according to an exemplary embodiment of the present invention.
Figure 5:
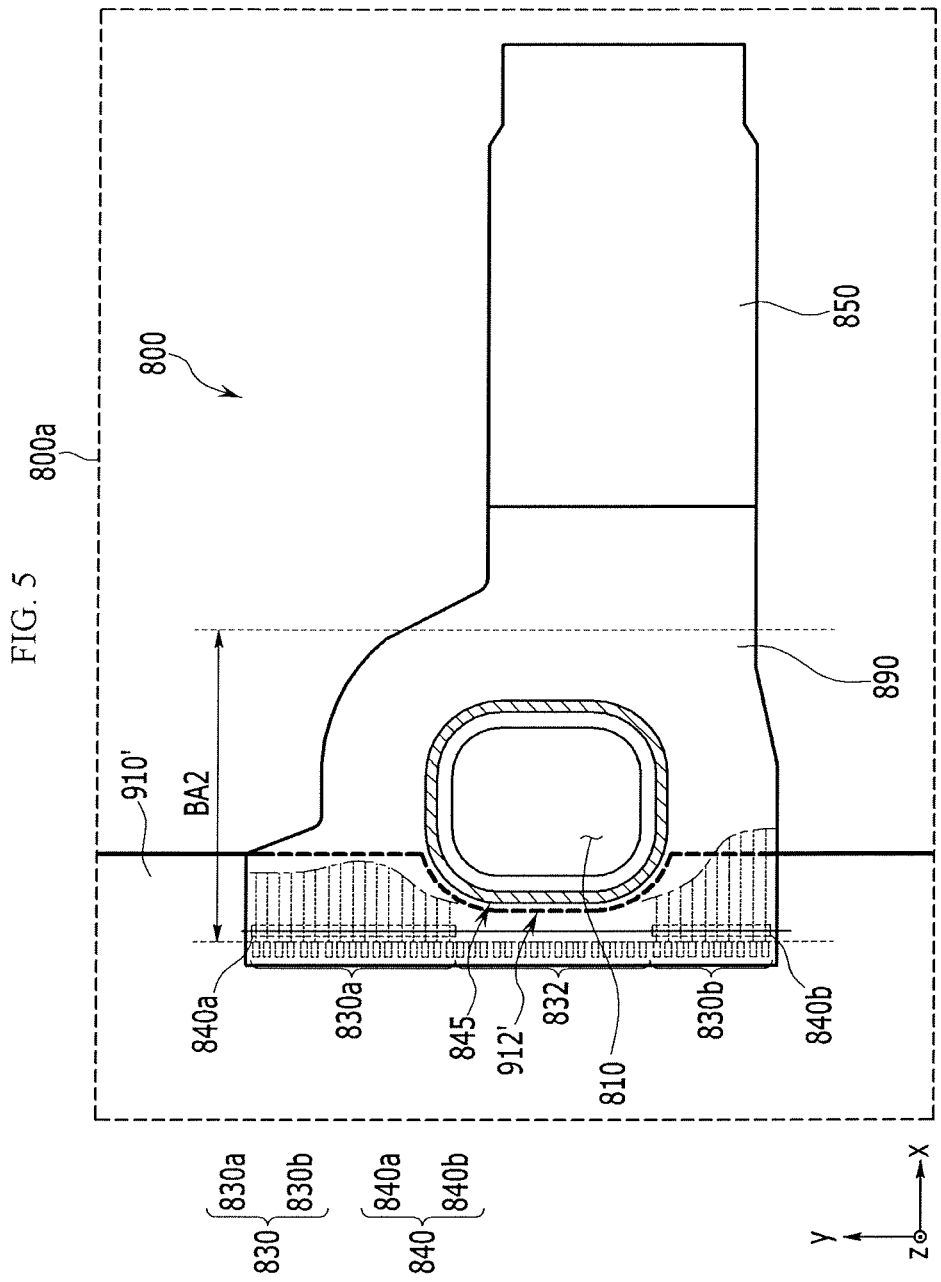
FIG. 5 illustrates a touch panel of FIG. 2 and a part of a second flexible circuit board connected to the touch panel according to an exemplary embodiment of the present invention.

The first flexible circuit board 800 is described in detail herein with reference to FIGS. 4 and 5. FIGS. 4 and 5 illustrate a part of the first flexible circuit board 100.

The touch control circuit board 850 may be disposed on the second flexible circuit board 800. The touch control circuit board 850 may be positioned at a lower surface of the display panel 900 as the second flexible circuit board 800 is bent.

The touch control circuit board 850 may include a touch control circuit. The touch control circuit may be configured to drive the touch panel 910. For example, the touch control circuit may be an IC (integrated circuit). The touch control circuit may be configured to generate the driving signal output, for example, to the touch sensing structure. The touch control circuit may be configured to receive a detection signal input, for example, from the touch sensing structure. The touch control circuit may be configured to determine a touch input existence, a touch input number, and a position of the touch input for the touch screen, for example, by using the driving signal and the detection signal.

The second flexible circuit board 800 may be connected to each of the touch panel 910 and the touch control circuit. The driving signal generated from the touch control circuit may be transmitted to the touch sensing structure. The signal output from the touch sensing structure may be transmitted to the touch control circuit.

According to an exemplary embodiment of the present invention, the touch control circuit board 850 may be the flexible printed circuit board (PCB) (FPCB).

The first flexible circuit board 100 will be described in detail with reference to FIG. 3.

FIG. 3 illustrates a part of a first flexible circuit board bonded to the display panel of FIG. 2 according to an exemplary embodiment of the present invention.

The first flexible circuit board 100 may include a base film 190, a plurality of signal wires 140, a static electricity discharge ring 145, a first pad part 130, a second pad part 170, and an IC chip 150.

The base film 190 may be a flexible film. The base film 190 may include a polyimide resin, an epoxy-based resin, or another flexible material. The signal wires 140 and the IC chip 150 may be formed on the base film 190.

The base film 190 may include a bending area BA1. The bending area BA1 may be formed in the region where the base film 190 is bent. The first flexible circuit board 100 may be bent in the bending area BA1.

The first opening 110 may penetrate the base film 190. The first opening 110 may be disposed in the bending area BA1. In the bending area BA1, the first opening 110 may include a member, for example, an electronic part. The electronic part might not be in direct contact with the base film 190. When the first flexible circuit board 100 is bent, the inner part of the mobile terminal may be positioned in the first opening 110.

The static electricity discharge ring 145 may be disposed at a circumference of the first opening 110. The static electricity discharge ring 145 may include a metal material. The metal material may have a predetermined resistance. The metal material may have a shape enclosing the first opening 110. The static electricity discharge ring 145 may be grounded. Thus, damage to the first flexible circuit board 100 by static electricity energy inflowed to the first opening 110 may be reduced or prevented.

The signal wires 140 may be disposed on the base film 190. The signal wires 140 may be disposed at a region except for a periphery of the first opening 110. The first opening 110 may be disposed between two adjacent signal wires among the signal wires 140a.

A first pad part 130a may be disposed at one end of the signal wires 140a. The IC chip 150 may be disposed at an end of the signal wires 140a opposite the first pad part 130a. A first pad part 130b may be disposed at one end of a plurality of signal wires 140b. The IC chip 150 may be disposed at an end of the signal wires 140b opposite the first pad part 130b.

A second pad part 170a may be disposed at one end of a plurality of signal wires 140c. The IC chip 150 may be disposed at an end of the signal wires 140c opposite the second pad part 170a. A second pad part 170b may be disposed at one end of a plurality of signal wires 140d. The IC chip 150 may be disposed at an end of the 140d opposite the second pad part 170b.

The first pad part 130 may be connected to the display panel 900. The second pad part 170 may be connected to the driving circuit substrate 300. The signal wires 140a and 140b connected to the first pad part 130 may extend from the first pad part 130 to the IC chip 150, for example, through the bending area BA1. The signal wires 140c and 140d connected to the second pad part 170 may extend from the second pad part 170 to the IC chip 150. An electrical signal configured to drive the display panel 900 may be generated in a driving circuit. The electrical signal may be transmitted to the display panel 900, for example, through the signal wires 140.

The first pad part 130 and the second pad part 170 may be terminals for power control of the driving circuit. The first pad part 130 and the second pad part 170 may either be configured as the input and output of the signal. For example, the first pad part 130 may be a signal output pad. The signal output pad may be configured to transmit the electrical signal to the pixels of the display panel 900. The second pad part 170 may be a signal input pad. The signal input pad may be configured to receive a data input and a control signals input from the outside.

The IC chip 150 may be configured to receive the data signal and the control signal that are input from the driving circuit, for example, through the signal wires 140c and 140d connected to the second pad part 170. The IC chip 150 may be configured to generate the driving signal, for example, by using the data signal and the control signal. The driving signal may be transmitted to the display panel 900. The driving signal may be transmitted to the display panel 900 through the signal wires 140a and 140b connected to the first pad part 130.

The second flexible circuit board 800 according to an exemplary embodiment of the present invention will be described in more detail with reference to FIGS. 4 and 5.

FIG. 4 illustrates a touch panel of FIG. 2 910 and a part of and a second flexible circuit board connected to a touch panel 910 according to an exemplary embodiment of the present invention. FIG. 5 illustrates a touch panel and a part of a second flexible circuit board connected to a touch panel according to an exemplary embodiment of the present invention.

As illustrated in FIG. 4, the second flexible circuit board 800 may be disposed at one side of the touch panel 910. The second flexible circuit board 800 may be connected with the touch control circuit board 850.

The second flexible circuit board 800 may include a base film 890, a plurality of signal wires 840, a static electricity discharge ring 845, a third pad part 830, and a dummy pad part 832.

The base film 890 may be a flexible film. The base film 890 may include a polyimide resin, an epoxy-based resin, or another flexible material. The signal wires 840 and the IC chip may be disposed on the base film 890.

The base film 890 may include the bending area BA2. The bending area BA2 may be bent in a region in which the base film 890 is bent. The second flexible circuit board 800 may be bent within the bending area BA2.

The second opening 810 may penetrate the base film 890. The second opening 810 may be disposed in the bending area BA2. In the bending area BA2, the second opening 810 may include a member, for example, an electronic part. The electronic part might not be in direct contact with the base film 890. When the second flexible circuit board 800 is bent, a part of the mobile terminal may be positioned in the second opening 810.

The second opening 810 might not overlap with an edge 912 of the touch panel 910 in a plan view. The second opening 810 may be separated from the edge 912 of the touch panel 910 in the first direction (e.g., the x-axis direction). The edge 912 of the touch panel 910 adjacent to the second opening 810 may be substantially a straight line that is substantially parallel to a Y-axis in a plan view.

The static electricity discharge ring 845 may be disposed at the circumference of the second opening 810. The static electricity discharge ring 845 may include a metal material. The metal material may have a predetermined resistance. The metal material may have a shape enclosing the second opening 810. The static electricity discharge ring 845 may be grounded. Thus, damage to the second flexible circuit board 800 by static electricity energy inflowed to the second opening 810 may be reduced or prevented.

The static electricity discharge ring 845 may be electrically connected to the static electricity discharge ring 145 disposed on the first flexible circuit board 100, and may be grounded. A metal member may be configured to connect the static electricity discharge ring 845 and the static electricity discharge ring 145. The metal member may be disposed between the first flexible circuit board 100 and the second flexible circuit board 800.

The signal wires 840 may be disposed on the base film 890. The signal wires 840 may be disposed at a region except for a periphery of the second opening 810. The first opening 810 may be disposed between two adjacent signal wires among the signal wires 840.

The third pad part 830 may be disposed at one end of the signal wires 840. For example, a third pad part 830a may be disposed at one end of a plurality of signal wires 840a. A third pad part 830b may be positioned at one end of a plurality of signal wires 840b.

The third pad part 830 may be connected to the touch panel 910. The signal wires 840 may extend in a direction of the touch control circuit board 850 from the third pad part 830, for example, through the bending area BA2. An electrical signal may be generated in a driving circuit. The electrical signal may drive the display panel 910. The electrical signal may be transmitted to the display panel 910, for example, through the signal wires 840.

The third pad part 830 may be the terminal for the input and output of a signal of the touch control circuit. For example, the third pad part 830 may include the signal output pad and the signal input pad. The signal output pad may be configured to transmit the signal to the touch sensing structure of the touch panel 910. The signal input pad may be configured to receive the signal from the touch sensing structure.

The dummy pad part 832 might not be configured to transmit the electrical signal for driving the touch panel 910. The dummy pad part 832 may be configured to provide a bonding function with the touch panel 910. If the dummy pad part 832 is omitted, a bonding force between the touch panel 910 and the second flexible circuit board 800 may be relatively weak.

As illustrated in FIG. 5, the second flexible circuit board 800 may be connected to the touch panel 910' at one side of a touch panel 910'. The second flexible circuit board 800 may be connected to the touch control circuit board 850.

The second flexible circuit board 800 of FIG. 5 may be substantially the same as the second flexible circuit board 800 of FIG. 4. Thus, repetitive descriptions thereof may be omitted.

The second opening 810 may penetrate the base film 890. The second opening 810 may be disposed at the bending area BA2 of the second flexible circuit board 800.

The second opening 810 might not overlap an edge 912' of the touch panel 910' in a plan view. The edge 912' of the touch panel 910' adjacent to the second opening 810 may have a shape corresponding to the edge of the second opening 810. For example, when the plane shape of the second opening 810 is a circle, the plane shape of the edge 912' of the touch panel 910' may have a similar shape including an arc corresponding to the circle shape of the second opening 810.

The edge of the touch panel 910' that is not adjacent to the second opening 810 may have the shape of a substantially straight line substantially parallel to the Y-axis. Thus, the edge 912' of the touch panel 910' adjacent to the second opening 810 may have a recessed shape in a plan view in the second direction opposite to the first direction (e.g., the X-axis direction) from the substantially straight line.

When the second flexible circuit board 800 and the first flexible circuit board 100 described with reference to FIGS. 4 and 5 are bent, the second opening 810 and the first opening 110 may provide a space to be inserted with the part of the mobile terminal. Accordingly, the inner space of the mobile terminal may be utilized.

Positions of the touch screen and the camera in the mobile terminal will be described in more detail with reference to FIG. 6 and FIG. 7.

Figure 6:
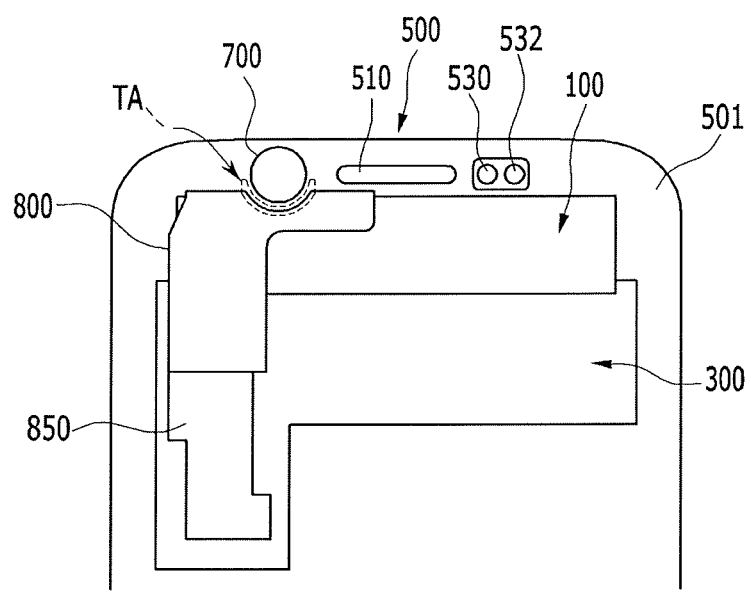
FIG. 6 is a top plan view illustrating a part of a mobile terminal according to an exemplary embodiment of the present invention.

FIG. 6 is a top plan view illustrating a part of a mobile terminal according to an exemplary embodiment of the present invention. FIG. 7 illustrates a part of a touch screen of a mobile terminal and a position of a camera according to an exemplary embodiment of the present invention.

The mobile terminal 500 may include a case, for example, a frame, a housing, or a cover. The case may be configured to form an exterior of the mobile terminal 500. The mobile terminal 500 may include a front case 501 and a rear case. Various parts may be disposed at an inner space formed by the front case 501 and the rear case.

The mobile terminal 500 may be configured so that one case provides the inner space. The mobile terminal 500 may include a uni-body of which a synthetic resin or a metal leads from a side to a back.

The touch screen may be disposed at an upper surface of the terminal body. The touch screen may be configured to output information. The window 930 of the touch screen may be disposed on the front case 501. Thus, the window 930 disposed on the front case 501 may form an upper surface of the terminal body.

A plurality of openings may be disposed within the front case 501 of the mobile terminal 500. The openings may be configured to expose the touch screen, the camera 700, a speaker, an illumination sensor, or a proximity sensor to the outside.

Referring to FIG. 6, the mobile terminal 500 may include the front case 501, the touch screen, the first flexible circuit board 100, the driving circuit substrate 300, the second flexible circuit board 800, the touch control circuit board 850, and the camera 700. The touch screen may be connected to the front case 501. The flexible circuit board 100 may be connected to the display panel 900. The second flexible circuit board 800 may be connected to the touch panel 910. The front case 501 may include a plurality of openings 510, 530 and 532. The opening 510 may be configured to expose the speaker to the outside. The opening 530 may be configured to expose the illumination sensor to the outside. The opening 532 may be configured to expose the proximity sensor to the outside.

Figure 7:
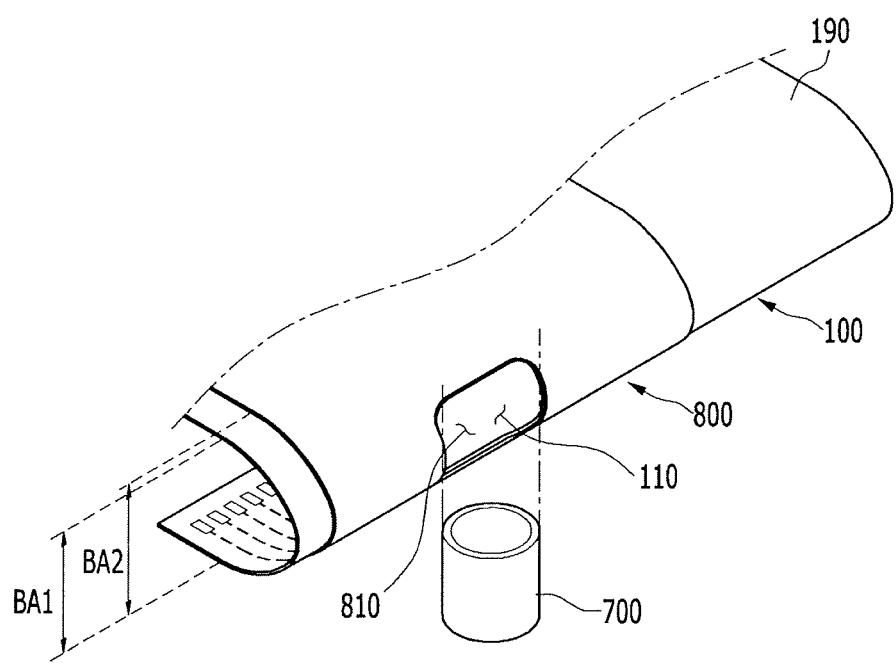
FIG. 7 is a view illustrating a part of a touch screen of a mobile terminal and a position of a camera according to an exemplary embodiment of the present invention.

Referring to FIG. 7, if the first flexible circuit board 100 is bent in the bending area BA1, a groove may be formed at a side of the bent first flexible circuit board 100. For example, when the plane shape of the first opening 110 is a circle, if the first flexible circuit board 100 is bent based on the first opening 110, the plane shape of the first opening 110 may made into a semicircle. When viewing the bent first flexible circuit board 100 in a direction substantially parallel to a Z-axis, the first opening 110 may be made into a groove shape.

The second flexible circuit board 800 may be bent to the first flexible circuit board 100, for example, with a wrapped shape. Similar to the first flexible circuit board 100, if the second flexible circuit board 800 is bent in the bending area BA2, a groove may be formed in a side of the bent second flexible circuit board 800.

The groove formed in the first flexible circuit board 100 and the groove formed in the second flexible circuit board 800 may overlap each other. The camera 700 may be positioned in a region TA of FIG. 6 in which the groove formed in the first flexible circuit board 100 and the groove formed in the second flexible circuit board 800 overlap each other.

When the second flexible circuit board 800 and the first flexible circuit board 100 are bent, the second opening 810 and the first opening 110 may provide a space in which the camera 700 is inserted. Therefore, according to an exemplary embodiment of the present invention, the inner space of the mobile terminal 500 may be utilized.

While exemplary embodiments of the present invention have been described herein, it is to be understood that the present invention is not limited thereto and is intended to cover various modifications and equivalent arrangements included within the spirit and scope of the present invention.

What is claimed is:

1. A touch screen panel, comprising:
   a display panel;
   a first flexible circuit board including a first end connected to the display panel, the first flexible circuit board having a first bending area and at least one first opening disposed in the first bending area;
   a touch panel disposed on the display panel and the first flexible circuit board; and
   a second flexible circuit board including a first end connected to the touch panel, the second flexible circuit board having a second bending area and at least one second opening corresponding to the at least one first opening, and wherein the at least one second opening is disposed in the second bending area and is at least partially overlapping with the at least one first opening disposed in the first bending area.

2. The touch screen panel of claim 1, wherein
   the first flexible circuit board includes the first bending area that is bent so that a second end of the first flexible circuit board is positioned at a rear surface of the display panel, wherein the second end is opposite the first end.

3. The touch screen panel of claim 2, wherein
   the second flexible circuit board includes the second bending area that is bent so that a second end of the second flexible circuit board is positioned at a rear surface of the display panel, wherein the second end is opposite the first end.

4. The touch screen panel of claim 3, wherein
   the first flexible circuit board is bent within the first bending area, the second flexible circuit board is bent within the second bending area, and
   the at least one first opening and the at least one second opening are overlapped with each other.

5. The touch screen panel of claim 3, wherein
   the second flexible circuit board includes:
   a second base film; and
   a plurality of second signal wires disposed on the second base film,
   wherein the second opening is disposed in the second bending area of the second base film.

6. The touch screen panel of claim 2, wherein
   the first flexible circuit board includes:
   a first base film,
   a plurality of first signal wires disposed on the first base film, and
   an IC chip disposed on the first base film and connected to the first signal wires,
   wherein the first opening is disposed in the first bending area of the first base film.

7. The touch screen panel of claim 2, further comprising
   a driving circuit substrate connected to the second end of the first flexible circuit board and driving the display panel.

8. The touch screen panel of claim 1, wherein
   the touch panel includes an edge having a concave shape in a plan view corresponding to a plane shape of the at least one second opening.

9. The touch screen panel of claim 1, wherein an edge of the at least one second opening is shifted from an edge of the at least one first opening by a predetermined distance.

10. A mobile terminal, comprising:
    a touch screen including a display panel and a touch panel disposed on the display panel;
    an electronic part including one of a sensor or a camera;
    a first flexible circuit board including a first end connected to the display panel and having at least one first opening disposed in a first bending area in the first flexible circuit board; and
    a second flexible circuit board including a first end connected to the touch panel and having at least one second opening corresponding to the at least one first opening, wherein the at least one second opening is disposed in a second bending area in the second flexible circuit board,
    wherein at least a portion of the electronic part is disposed in each of the at least one first opening and the at least one second opening.

11. The mobile terminal of claim 10, wherein
the first flexible circuit board includes the first bending area that is bent so that a second end of the first flexible circuit board is positioned at a rear surface of the display panel.

12. The mobile terminal of claim 11, wherein
the second flexible circuit board includes the second bending area that is bent so that a second end of the second flexible circuit board is positioned at a rear surface of the display panel.

13. The mobile terminal of claim 12, wherein
the first flexible circuit board is bent within the first bending area, the second flexible circuit board is bent within the second bending area,
the at least one first opening forms at least one first groove,
the at least one second opening forms at least one second groove, and
the at least one first groove and the at least one second groove are overlapped with each other.

14. The mobile terminal of claim 13, wherein
at least a portion of the camera is disposed in each of the at least one first groove and the at least one second groove.

15. The mobile terminal of claim 12, wherein
the second flexible circuit board includes:
a second base film; and
a plurality of second signal wires disposed on the second base film,
wherein the at least one second opening is disposed in the second bending area of the second base film.

16. The mobile terminal of claim 11, wherein
the first flexible circuit board includes:
a first base film;
a plurality of first signal wires disposed on the first base film; and
an IC chip disposed on the first base film and connected to the first signal wires,
wherein the at least one first opening is disposed in the first bending area of the first base film.

17. The mobile terminal of claim 10, wherein
the touch panel includes an edge having a concave shape in a plan view corresponding to a plane shape of the at least one second opening.

18. A touch screen panel, comprising:
a display panel;
a first flexible circuit board having at least one first opening having a plane shape disposed in a first bending area in the first flexible circuit board;
a touch panel disposed on the display panel and the first flexible circuit board; and
a second flexible circuit board having at least one second opening having a plane shape disposed in a second bending area in the second flexible circuit board,
wherein the at least one second opening corresponds to the at least one first opening, and
wherein the plane shape of the at least one first opening corresponds to the plane shape of the at least one second opening, and the at least one first opening is at least partially overlapping with the at least one second opening.

19. The touch screen panel of claim 18, wherein the first flexible circuit board includes a first end connected to the display panel, and
the second flexible circuit board includes a first end connected to the touch panel.

20. The touch screen panel of claim 19, wherein
the first flexible circuit board includes the first bending area that is bent so that a second end of the first flexible circuit board is positioned at a rear surface of the display panel, wherein the second end is opposite the first end.

21. The touch screen panel of claim 19, wherein
the second flexible circuit board includes the second bending area that is bent so that a second end of the second flexible circuit board is positioned at a rear surface of the display panel, wherein the second end is opposite the first end.

* * * * *